United States Patent
Kim

(10) Patent No.: US 9,609,394 B2
(45) Date of Patent: Mar. 28, 2017

(54) METHOD AND SYSTEM FOR ZAPPING ADVERTISEMENT SERVICE

(71) Applicant: ZAPPLE INC., Seoul (KR)

(72) Inventor: Jong Ryul Kim, Seoul (KR)

(73) Assignee: ZAPPLE, INC., Seoul (KR)

( * ) Notice: Subject to any disclaimer, the term of this patent is extended or adjusted under 35 U.S.C. 154(b) by 974 days.

(21) Appl. No.: 13/857,879

(22) Filed: Apr. 5, 2013

(65) Prior Publication Data
US 2013/0276005 A1  Oct. 17, 2013

Related U.S. Application Data

(63) Continuation of application No. PCT/KR2012/006929, filed on Aug. 30, 2012.

(30) Foreign Application Priority Data

Sep. 9, 2011 (KR) .................. 10-2011-0092055

(51) Int. Cl.
*H04N 21/81* (2011.01)
*G06Q 30/02* (2012.01)
*H04N 21/2543* (2011.01)

(52) U.S. Cl.
CPC ....... *H04N 21/812* (2013.01); *G06Q 30/0241* (2013.01); *H04N 21/25435* (2013.01)

(58) Field of Classification Search
CPC .......... H04N 21/25435; H04N 21/812; G06Q 30/0241

(Continued)

(56) References Cited

U.S. PATENT DOCUMENTS 6,806,913 B2 * 10/2004 Kim .................. H04N 21/4316
                                                                  348/473
7,669,212 B2 *  2/2010 Alao ................. G06Q 30/0209
                                                                  725/32

(Continued)

FOREIGN PATENT DOCUMENTS

JP        11-017633 A     1/1999
JP     2003-087827 A     3/2003

(Continued)

OTHER PUBLICATIONS

"KR1020090124641_english translation"—unexamined patent application No. 1020090124641; Publication date: Dec. 3, 2009; Title : Zapping advertisement method and apparatus; Inventor: Lim Jae Gook; Applicant: NAVER Business Platform Corp.; Application No. 1020080050968.*

*Primary Examiner* — Nathan Flynn
*Assistant Examiner* — Caroline Somera

(57) ABSTRACT

Disclosed herein are a method and a system for a zapping advertisement service, and more particularly, a method and a system for providing various kinds of advertisement services targeted to a content recipient to an advertiser wanting a zapping advertisement and effectively exposing the zapping advertisement to the content recipient. Accordingly, an embodiment of the present invention provides additional information corresponding to the zapping advertisement according to a user request when the zapping advertisement is provided for zapping time generated at the time of switching a channel and maximizing an advertisement effect for the zapping time by repeatedly providing corresponding zapping advertisements, or continuously providing the zapping advertisement associated therewith at the time of switching the screen.

11 Claims, 13 Drawing Sheets

(58) Field of Classification Search
USPC .......................................... 725/8, 22, 32, 42
See application file for complete search history.

(56) References Cited

U.S. PATENT DOCUMENTS

| | | | | |
|---|---|---|---|---|
| 8,190,460 | B1* | 5/2012 | Andersen | G06Q 10/0631 |
| | | | | 705/14.72 |
| 8,214,861 | B2* | 7/2012 | Kim | H04N 7/17318 |
| | | | | 725/32 |
| 2005/0144637 | A1* | 6/2005 | Shikata | G06F 3/0482 |
| | | | | 725/35 |
| 2005/0283797 | A1* | 12/2005 | Eldering | G06Q 30/02 |
| | | | | 725/35 |
| 2006/0101488 | A1* | 5/2006 | Cho | H04N 5/4401 |
| | | | | 725/39 |
| 2009/0226148 | A1 | 9/2009 | Nesvadba et al. | |
| 2010/0162298 | A1 | 6/2010 | Ahn | |
| 2011/0265117 | A1 | 10/2011 | Cha et al. | |
| 2012/0303426 | A1* | 11/2012 | Morad | G08G 1/133 |
| | | | | 705/14.4 |

FOREIGN PATENT DOCUMENTS

| | | | |
|---|---|---|---|
| JP | 2008-271194 A | 11/2008 | |
| KR | 10-2007-0046846 A | 5/2007 | |
| KR | 10-2009-0054406 A | 5/2009 | |
| KR | 10-2009-0100132 A | 9/2009 | |
| KR | 10-2009-0124641 A | 12/2009 | |
| KR | 10-2010-0020284 A | 2/2010 | |
| KR | 10-2010-0072718 A | 7/2010 | |
| KR | 10-2010-0092248 A | 8/2010 | |
| KR | 100988282 B1 * | 10/2010 | ............... H04N 5/50 |

* cited by examiner

| CHANNEL | SBS (NO. 5) | HOME SHOPPING (NO. 6) | KBS2 (NO. 7) | MBC (NO. 11) | J GOLF (NO. 54) | · · · | TvN (NO. 45) | | 200 CHANNELS |
|---|---|---|---|---|---|---|---|---|---|
| PROGRAM | MOVIE | DRAMA | ENTERTAINMENT | | | | | n+1 | 100,000 PIECES |
| APPLICATION | GAME | WEATHER | EDUCATION | | | | | n+m+1 | 10,000 APPLICATIONS |

Fig.4

METHOD AND SYSTEM FOR ZAPPING ADVERTISEMENT SERVICE

TECHNICAL FIELD

The present invention relates to a method and a system for a zapping advertisement service, and more particularly, to a method and a system for a zapping advertisement service providing various kinds of advertisement services targeting a content recipient by an advertiser wanting to use a zapping advertisement and effectively exposing the zapping advertisement to the content recipient.

BACKGROUND ART

In digital broadcasting, the time for which any video and audio are not output from about 0.5 seconds to several seconds prior to changing to a screen of the next channel from the time of switching a screen in response to a channel change is referred to as zapping time. The zapping time is time for a digital broadcasting receiving apparatus to receive, process and display a digital broadcasting signal from a broadcasting station. In digital broadcasting, a broadcasting signal is transmitted in a compressed form, such that it takes a predetermined time for the digital broadcasting receiving apparatus to decode the compressed broadcasting signal and convert the decoded signal into a reproducible form.

In digital broadcasting, the zapping times may be recognized as important advertising resources to advertisers. Therefore, a technology of inserting an advertisement for the zapping time has been proposed in recent years.

However, the zapping advertisement related technology field according to the related art discloses only how to insert the advertisement, but does not disclose various types of service technologies associated with the zapping advertisement. Advertisers and viewers could benefit from additional services related to zapping advertisements.

DISCLOSURE

Technical Problem

Accordingly, the present invention has been made to solve the above-mentioned problems occurring in the prior art without compromising advantages achieved by the prior art.

One advantage of embodiments according to the present invention is to provide a method and a system for a zapping advertisement service capable of proposing various kinds of zapping advertisement services to an advertiser, and providing a maximum effect of an exposed zapping advertisement to a viewer.

Technical Solution

In one aspect of the present invention, there is provided a method for a zapping advertisement service, including: providing a zapping advertisement for zapping time generated at the time of switching a screen; sensing an additional information request signal for the provided zapping advertisement; and when the additional information request signal is sensed, providing the additional information corresponding to the zapping advertisement.

In another aspect of the present invention, there is provided a method for a zapping advertisement service, including: providing a first zapping advertisement for a first zapping time generated at the time of being switched to a first screen; and repeatedly providing the first zapping advertisement for a second zapping time generated at the time of being switched to a second screen within predetermined time from the switching time to the first screen or providing a second zapping advertisement associated with the first zapping advertisement.

In still another aspect of the present invention, there is provided a method for calculating a zapping advertisement cost exposed for zapping time generated at the time of switching a screen, the method including: determining cost per one-time exposure of an advertisement to calculate cost according to an exposure frequency of the advertisement as advertisement cost or determine a basic cost according to a predetermined exposure frequency, and when the exposure frequency of the advertisement exceeds a predetermined exposure frequency, calculating cost according to an excessive exposure frequency along with the basic cost as the advertisement cost.

In yet another aspect of the present invention, there is provided a computer-readable recording medium recorded with a program for implementing a user interface in an advertiser terminal so as to allow a zapping advertisement server to receive a zapping advertisement application, wherein the computer-readable recording medium carries out steps of selecting a region of a content service applied with a zapping advertisement, inputting a target advertisement point in the selected region, inputting a price model of the zapping advertisement, inputting a kind of goods of the zapping advertisement, and uploading the zapping advertisement and additional information corresponding to the zapping advertisement.

In still yet another aspect of the present invention, there is provided a zapping advertisement server, including: an advertisement accepting unit providing a user interface for a zapping advertisement application and receiving a zapping advertisement and additional information and storing the received zapping advertisement and additional information in a database unit; an advertisement scheduling unit generating an advertisement mapping table according to zapping advertisement application contents; and a control unit referring to the advertisement mapping table to transmit a corresponding first zapping advertisement when a first screen switching request signal is received and repeatedly providing the first zapping advertisement or transmitting a second zapping advertisement associated with the first zapping advertisement when a second screen switching request signal is received within a predetermined period from a receiving time of the first screen switching request signal.

In further still yet another aspect of the present invention, there is provided a content receiving terminal, including: a database unit storing a zapping advertisement, additional information, and an advertisement mapping table; a user input unit receiving a screen switching request signal or an additional information request signal; and a control unit referring to the advertisement mapping table to extract and expose a corresponding first zapping advertisement from the database unit when a first screen switching request signal is received from the user input unit and repeatedly exposing the first zapping advertisement or exposing a second zapping advertisement associated with the first zapping advertisement when a second screen switching request signal is received within a predetermined period from a receiving time of the first screen switching request signal.

Advantageous Effects

As set forth above, according to embodiments of the present invention, it is possible to satisfy a user's desire for information by additionally providing detailed information according to the user request and needs, rather than merely providing a zapping advertisement for the zapping time which is occurs at the time of switching a screen.

Further, according to embodiments of the present invention, it is possible to maximize the advertisement effect for the zapping time by repeatedly providing one or more corresponding zapping advertisement at the time of switching the screen.

That is, when the user continuously switches the screen, the user's attention is focused on the screen. In this case, the images or messages for specific enterprise, products, services, contents, and the like, can be imprinted on the user's mind by repeatedly exposing the zapping advertisement of the same advertiser or exposing a related series of zapping advertisements.

In addition, an advertiser wanting to provide a zapping advertisement can use the user interface for carrying out the zapping advertisement application online to conveniently apply the zapping advertisement anytime and anywhere.

That is, the advertiser can select various types of content service regions and the target advertising points (channel, genre, category, and the like) applied with the zapping advertisement in each region using the user interface for zapping advertisement application and determine the price model and the type of advertisement service (general service, package service) of the zapping advertisement, such that the advertiser can receive the zapping advertisement service most suitable for him/her.

DESCRIPTION OF DRAWINGS

The above and other objects, features and advantages of the present invention will be more apparent from the following detailed description taken in conjunction with the accompanying drawings, in which:

FIG. 4 is a diagram illustrating regions in which a zapping advertisement exposed for a zapping time is used according to an embodiment of the present invention;

BEST MODE

Hereinafter, embodiments of the present invention will be described in detail with reference to the accompanying drawings. Configuration and effects of embodiments of the present invention will be clearly understood through the following detailed description. The same reference numbers refer to the same features in separate figures, and a detailed description of well-known functions or configurations will be omitted in order not to unnecessarily obscure the subject matter of the present invention.

This Application is related to PCT Application No. PCT/KR2012/007920 and PCT Application No. PCT/KR2012/004321, each of which are incorporated herein by reference.

Figure 1:
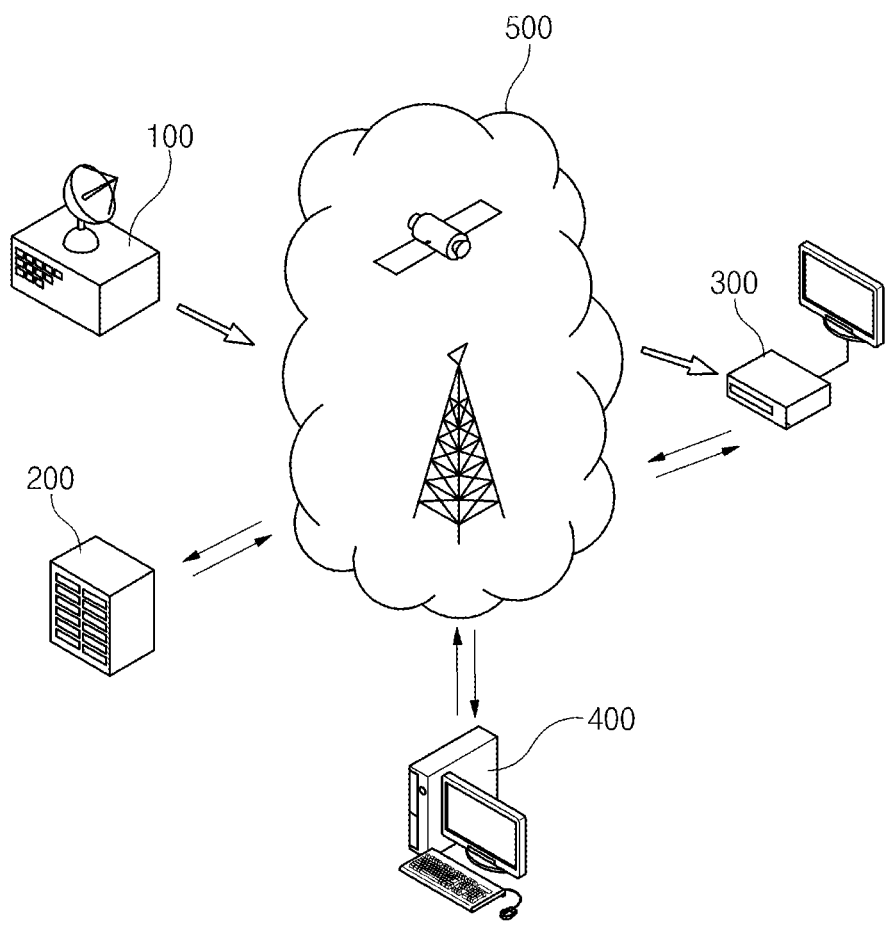
FIG. 1 is an illustration of a system for a zapping advertisement service according to an embodiment of the present invention.

FIG. 1 illustrates a system for a zapping advertisement service according to an embodiment of the present invention. Referring to FIG. 1, the system for a zapping advertisement service includes a content providing server 100, a zapping advertisement server 200, a content receiving terminal 300, an advertiser terminal 400, a network 500 through which each component communicates with each other, and the like.

The content providing server 100 provides various digital contents to the content receiving terminal 300. The content providing server 100 may be a terrestrial broadcasting station, a local cable broadcasting station, an Internet protocol television (IPTV) broadcasting station, a satellite broadcasting station, a video on demand (VOD) server, an application server, and the like.

The zapping advertisement server 200 provides a zapping advertisement to be exposed during a zapping time to the content receiving terminal 300. The zapping advertisement exposed during the zapping time may include advertisements for contents, enterprises, products, services, and the like. The zapping advertisement may be provided in various forms, such as a keyword, a graphic image, moving pictures, sound, and the like. Further, the zapping advertisement server 200 may provide more detailed additional information corresponding to the advertisement exposed during the zapping time. In addition, the zapping advertisement server 200 may receive zapping an advertisement application from an advertiser, calculate a cost for the zapping advertisement, and charge an advertiser an advertising expense.

The content receiving terminal 300 receives various digital contents from the content providing server 100 and displays the received digital content on a screen. The content receiving terminal 300 also receives the zapping advertisement from the zapping advertisement server 200 and exposes the zapping advertisement during the zapping time. The content receiving terminal 300 may include a digital device, such as a mobile phone having a digital multimedia broadcasting (DMB) or digital video broadcasting-handheld (DVB-H) receiving module embedded therein, a smart phone, a notebook, a tablet PC, a personal multimedia player (PMP), a navigation, and the like, in addition to a set top box receiving terrestrial, satellite, or cable broadcasting, a TV having a set top box function embedded therein, and an Internet based IPTV.

The advertiser terminal 400 is a terminal of an advertiser wanting to place the zapping advertisement. The advertiser accesses the zapping advertisement server 200 through the advertiser terminal 400 to place the zapping advertisement. The advertiser terminal 400 may determine whether to insert zapping advertisements at a particular zapping time on a zapping advertisement application screen provided by the zapping advertisement server 200 to place the zapping advertisement. The advertiser terminal 400 may be a personal computer, but other types of device that can access the Internet, such as a smart phone or a tablet computer, may be used as the advertiser terminal 400.

The network 500, which is a wired and/or wireless communication network, such as a terrestrial wave, a satellite, a cable, Internet, and the like, facilitates communication between the content providing server 100 and the content receiving terminal 300, between the zapping advertisement server 200 and the content receiving terminal 300, and between the zapping advertisement server 200 and the advertiser terminal 400. The content providing server 100 transmits the digital contents to the content receiving terminal 300 via the network 500, the zapping advertisement server 200 transmits the zapping advertisement to the content receiving terminal 300 via the network 500, and the advertiser terminal 400 applies the zapping advertisement to the zapping advertisement server 200 through the network 500.

In an embodiment in which the content providing server 100 transmits the digital contents through a terrestrial wave or a satellite, the zapping advertisement server 200 may be separately implemented from the content providing server 100 as illustrated in FIG. 1 to provide the zapping advertisement through another communication network, such as the Internet In an embodiment in which the content providing server 100 transmits the digital contents via the Internet, the zapping advertisement server 200 may be integrally implemented with the content providing server 100.

Figure 2:
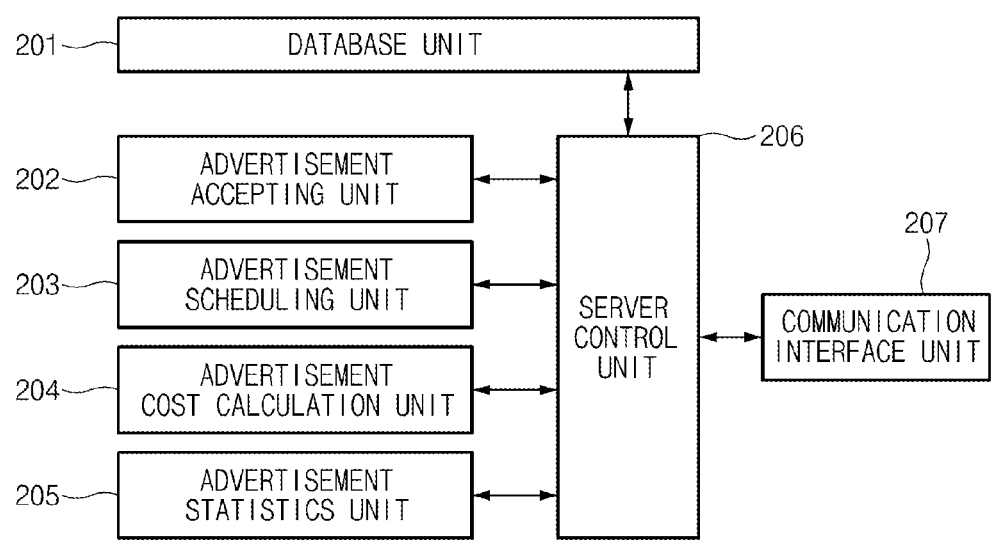
FIG. 2 is an illustration of a zapping advertisement server according to an embodiment of the present invention.

FIG. 2 illustrates an internal configuration of the zapping advertisement server 200.

Referring to FIG. 2, the zapping advertisement server 200 includes a database unit 201, an advertisement accepting unit 202, an advertisement scheduling unit 230, an advertisement expense calculation unit 204, an advertisement statistics unit 205, a server control unit 206, a communication interface unit 207, and the like.

The database unit 201 stores the zapping advertisement exposed during the zapping time and additional information corresponding to the zapping advertisement. The database unit 201 may be implemented as a separate database server.

The advertisement accepting unit 202 provides the zapping advertisement application screen to the advertiser terminal 400 and receives zapping advertisements to be exposed during the zapping time, the additional information corresponding to the zapping advertisement, and the like, from the advertiser terminal 400. The advertiser terminal 400 may provide the zapping advertisement, the additional information corresponding to the zapping advertisement, a screen switching section in which the zapping advertisement is exposed, time, a number of exposures, a district, and the like, through the zapping advertisement application screen. For example, time may correspond to when the zapping advertisement exposed, and the district may correspond to locations the zapping advertisement broadcasted.

The screen switching may be carried out by changing a channel of a broadcasting service, a program genre of a video on demand service, or an application category of an application service. The advertiser may select a specific channel, a genre, or a category to determine the screen switching period in which the zapping advertisement is exposed. The screen switching period has the same meaning as a target advertisement point and the target advertisement point will be described in more detail with reference to the zapping advertisement application process (see FIG. 3).

The advertisement scheduling unit 203 uses the advertisement application contents accepted in the advertisement accepting unit 202 to create an advertisement mapping table. The advertisement mapping table is updated every time the advertisement application is accepted and is stored in the database unit 201. The advertisement mapping table may be classified into a broadcasting service, a video on demand video service, an application service, and the like. The advertisement mapping table may include information such as a screen switching section (specific channel, genre, category, and the like), an advertiser ID, an advertisement type, an advertisement ID, a kind of advertisement service, presence and absence of additional information, an exposure time, an exposure region, an exposure frequency, and the like.

The advertisement expense calculation unit 204 calculates cost for the advertisement exposed during the zapping time initiated from the time of switching a screen. The advertisement expense calculation unit 204 may calculate an advertisement expense based on cost per single exposure unit, or calculate an advertisement expense by adding an added cost for an additional number of times that the advertisement is exposed (exposure units) to a basic cost based on a predetermined exposure number.

In other words, a first expense scheme charges an advertiser for each exposure unit, which is a single instance in which a zapping advertisement is exposed. For example, if an exposure unit charge is 0.01 dollars and an advertisement is exposed 100 times, an advertiser is charged 1.00 dollars. A second expense scheme includes a first charge for a predetermined number of exposure units, and a second charge which is based on a number of exposures beyond the predetermined number. For example, a fee may be 1.00 dollars for all exposures up to 100 exposure units, and 0.10 dollars for every additional exposure beyond the 100 units.

The advertisement statistics unit 205 may calculate a total number of advertisement exposures, otherwise referred to as exposure units, a total number of exposure units per channel, a number of exposure units for each genre in a video on demand service, and total exposure units for each category in the application service. The numbers of exposure units may be calculated for a predetermined time, such as a day, a week, or a month, to determine advertising frequency values. Further, the advertisement statistics unit 205 may analyze the advertisement exposure number for each time or each district. The statistical data analyzed by the advertisement statistics unit 205 becomes a basis for determining costs at the time calculating the advertisement expense.

In order to implement the zapping advertisement service according to an embodiment of the present invention, a method for placing the zapping advertisement during the zapping time is divided into a network scheme for allowing the zapping advertisement server 200 to provide the zapping advertisement in real time, and a stand-alone scheme for allowing the content receiving terminal 300 downloading the zapping advertisement from the zapping advertisement server 200 to directly provide a zapping advertisement.

In an embodiment of the network scheme, the server control unit 206 confirms whether a signal received from the content receiving terminal 300 is a screen switching request signal or an additional information request signal. When the received signal is the screen switching request signal, the server control unit 206 searches an advertisement mapping table to confirm the zapping advertisement corresponding to the screen switching section (specific channel, genre, category to be changed).

The server control unit 206 retrieves the zapping advertisement stored in the database unit 201 and transmits the retrieved zapping advertisement to the content receiving terminal 300 via the communication interface unit 207. When the signal received from the content receiving terminal 300 is the additional information request signal, the server control unit 206 retrieves additional information corresponding to the zapping advertisement from the database unit 201 and transmits the retrieved additional information to the content receiving terminal 300 via the communication interface unit 207.

In an embodiment of the stand-alone scheme, when the server control unit 206 receives a request of a data download from the content receiving terminal 300, the server control unit 206 transmits the zapping advertisement, the additional information and the advertisement mapping table which are stored in the database unit 201 to the content receiving terminal 300 via the communication interface unit 207. The sever control unit 206 may transmit the zapping advertisement, the additional information and the advertisement mapping table to the content receiving terminal 300 via the communication interface unit 207 when the database unit 201 is updated or periodically.

The communication interface unit 207 performs signal modulation or demodulation so that the zapping advertisement server 200 may transmit and receive data to and from the content receiving terminal 300. The communication interface unit 207 performs the signal modulation so that the zapping advertisement and the additional information may be transmitted via the network 500 and performs the signal demodulation so that the signal received from the content receiving terminal 300 may be processed by the zapping advertisement server 200.

The zapping advertisement server 200 receives an zapping advertisement application from the advertiser terminal 400 so as to provide the zapping advertisement service to the content receiving terminal 300. The zapping advertisement server 200 may store and manage the zapping advertisement received through the zapping advertisement application process. The zapping advertisement server 200 may provide the zapping advertisement to the content receiving terminal 300 in real-time (network scheme) or provide one or more zapping advertisement to the content receiving terminal 300 in a predetermined transmission (stand-alone scheme). The zapping advertisement application process is performed by the advertisement accepting unit 202 of the zapping advertisement server 200. The zapping advertisement application process will be described below in detail in with respect to the advertiser terminal 400.

Figure 3:
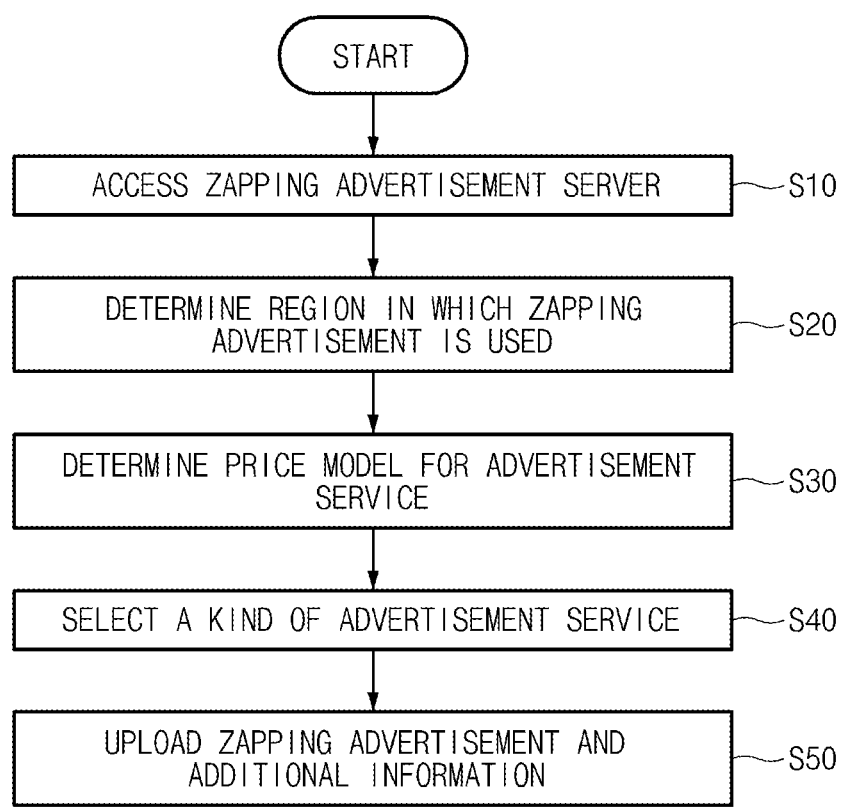
FIG. 3 is a flow chart illustrating a process of zapping advertisement application according to an embodiment of the present invention.

FIG. 3 is a flow chart illustrating the zapping advertisement application process. Prior to the zapping advertisement application process, an advertisement agent operating the zapping advertisement server 200 develops an online and offline business for accepting an advertisement. The advertiser may recognize the value of the zapping advertisement according to the business activity of the advertisement agent and thus apply for a zapping advertisement to the advertisement agent online or offline. According to an embodiment of the present invention, the advertiser accesses the zapping advertisement server 200 via the advertiser terminal 400 and applies the zapping advertisement following the online application scheme.

The advertiser terminal 400 provides a site address to a web browser to access the zapping advertisement server 200 (S10). When the advertiser terminal 400 accesses the zapping advertisement server 200, the zapping advertisement server 200 provides the zapping advertisement application screen to the advertiser terminal 400. The advertiser terminal 400 carries out the zapping advertisement application procedure via the zapping advertisement application screen.

First, the advertiser terminal 400 determines to which region the zapping advertisement of the advertiser terminal 400 is exposed (S20). The zapping advertisement server 200 presents a channel region displaying a broadcasting service, a program genre region displaying a video on demand service, an application category region displaying an application service, and the like to the advertiser terminal 400. An embodiment of the present invention describes, by way of example, a channel, a genre, and a category as regions in which the zapping advertisement may be exposed, but embodiments are not limited to the specifically disclosed regions. When various types of services are developed and provided, embodiments may also include regions corresponding to each service.

FIG. 4 is a diagram illustrating regions in which the zapping advertisement is exposed during the zapping time. Referring to FIG. 4, the channel region is a region for inputting a channel number or clicking a channel moving button to switch a broadcasting screen in related to the terrestrial and cable broadcasting. In other words, the channel region is a channel corresponding to the zapping advertisement, so that when a user changes to a particular channel, the zapping advertisement associated with that channel is displayed. The program genre region, which is particularly applicable to the video on demand service, is a region for inputting a specific genre of program by selecting a movie, a drama, entertainment, or other broadcast genres. The application category region is a region for inputting a specific category of application by clicking categories, such as game, weather, education, and the like, in the application service.

When the channel region is selected, the advertiser terminal 400 determines which zapping advertisement is exposed at the zapping time associated with changing to the channel associated with the channel region, which may also be referred to as a target channel. For example, the advertiser terminal 400 may select a home shopping (No. 6) channel and a J golf (No. 54) channel among several channels illustrated in FIG. 4 as a target channel of the zapping advertisement. For example, the target channel corresponds to new channel to be changed.

When the program genre region is selected, the advertiser terminal 400 may select at least one of several genres, such as movie, drama, entertainment, and the like, as a target genre of the zapping advertisement. Similarly, when the application category region is selected, the advertiser terminal 400 may select at least one of several categories, such as game, weather, education, and the like, as the target genre of the zapping advertisement. The target channel, the target genre, and the target category may be commonly called the target advertisement point. The target advertisement point is related to a section in which the zapping advertisement is exposed during the zapping time in which the channel, genre, or category is changed to the target channel, genre, and category selected by the advertiser terminal 400. The target advertisement point has substantially the same meaning as the screen switching section.

In addition to the selected advertisement region and the target advertisement point in which the zapping advertisement is displayed, the advertiser terminal 400 may additionally select the time or the district in which the zapping advertisement is exposed.

After at least one region of a target advertisement point is selected, the advertiser terminal 400 determines a price model in regards to advertisement services (S30). The zapping advertisement server 200 may propose at least two price models in regards to the advertisement service.

A first price model is cost per click (CPC) and a second price model is cost per millennium (CPM). The CPC has the same meaning as cost per a number of times that the zapping advertisement is exposed. In an embodiment, the CPC may be calculated by multiplying the number of times an advertisement is exposed to a viewer by advertisement particular value based on the price model. The CPM may be calculated by adding a value associated with a predetermined number of times a zapping advertisement is viewed (basic cost), and a product of multiplying a number of times the zapping advertisement is viewed in excess of the predetermined number of times by an excess exposure value. The advertisement cost may be calculated based on the price model selected through the advertiser terminal 400. The advertisement cost such as the basic cost of an advertisement may be determined based on statistics for the number of times that a user changes content to content corresponding to the target advertisement point. When only one advertiser applies for a target advertisement point, the advertisement cost determined by the zapping advertisement server 200 may be applied.

In another embodiment, at least one region of a target advertisement point may be subject to a bidding process. In such an embodiment, an initial value may be determined by the advertisement terminal 400 as a starting point for bidding. After a bidding time is finished, the highest bidder may have the exclusive ability to serve a particular advertisement for the at least one region which was the subject of the bidding.

Next, the advertiser terminal 400 may select a type of advertisement service (S40). That is, the advertiser terminal 400 may purchase a first type of advertisement service which includes a charge for each target advertisement point as a general advertisement service, and a second type of service, or package service, in which an advertiser may purchase each target advertisement point as a package of advertisement services through which the advertisement may be continuously, or repeatedly, exposed. When the target advertisement point is purchased as the general advertisement service, a zapping advertisement corresponding to the specific target advertisement point at the time of switching a screen ends by being exposed once, but when the target advertisement point is purchased as the package service, if the screen switching is carried out and then a next screen switching is carried out within predetermined time, the zapping advertisement corresponding to the specific target advertisement point may be continuously exposed during the corresponding zapping time or other related zapping advertisements may be exposed. When the target advertisement point is purchased as the package service, the advertiser terminal 400 may determine a block of time during which zapping advertisements for the advertiser are exclusively exposed, a sequence in which more than one zapping advertisement is presented within the predetermined block of time, and the like, and register other related zapping advertisements.

When the advertisement region, the advertisement price model, the kind of advertisement service, and the like are determined, the advertiser terminal 400 uploads a customized zapping advertisement or a zapping advertisement produced by the advertiser and additional information corresponding to the zapping advertisement to the zapping advertisement sever 200 (S50). If it is difficult to produce the advertisement, the advertiser terminal 400 may send a request for the production of the zapping advertisement or the additional information of the zapping advertisement to the zapping advertisement server 200.

As described above, the zapping advertisement server 200 accepts a zapping advertisement application from one or more advertiser terminal 400 to create the advertisement mapping table and stores the zapping advertisement and the additional information uploaded from the advertiser terminal 400 or produced according to the production request in the database unit 201.

FIG. 5 is illustrates various examples of zapping advertisements according to embodiments of the present invention.

Figure 5A:
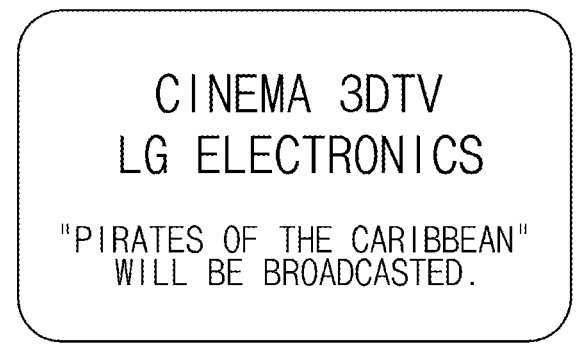
FIGS. 5A-5C are diagrams illustrating examples of zapping advertisement.
Figure 5B:
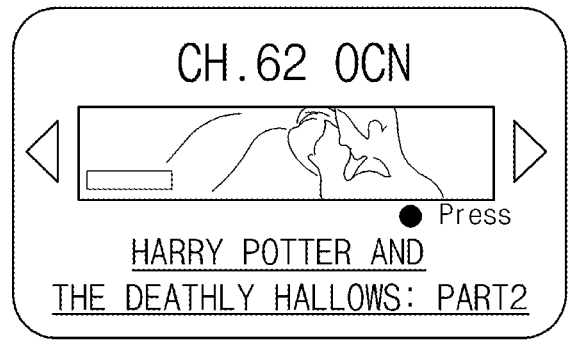
Figure 5C:
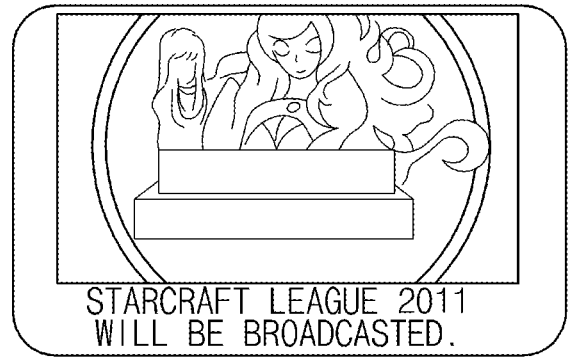

A zapping advertisement may be exposed in forms such as a text, a banner, a graphic image, moving pictures, and the like. FIG. 5A illustrates a text-based zapping advertisement, FIG. 5B illustrates a zapping advertisement in a banner form, and FIG. 5C illustrates a zapping advertisement in the form of a graphic image. When a zapping advertisement in one of the various forms is exposed, a mark informing the presence of additional information corresponding to the zapping advertisement may be added to a predetermined portion of the zapping advertisement screen.

In the zapping advertisement screen of FIG. 5B, marks such as '● Press' are added to a portion under the banner, which are the additional information mark. The additional information mark may be displayed on the zapping advertisement screen when the additional information corresponding to the zapping advertisement is registered. A viewer may view the additional information corresponding to the corresponding zapping advertisement when a viewer presses a specific key while the additional information mark is exposed. That is, a screen moves to an advertisement page including detailed contents in response to an input of the specific key (hot key) of a viewer.

As described above, a method for a zapping advertisement service according to embodiments of the present invention may be divided into a network scheme providing the zapping advertisement in real time from the zapping advertisement server 200 and a stand-alone scheme directly reading a zapping advertisement stored in the content receiving terminal 300. Hereinafter, the network scheme is described as a first embodiment and the stand-alone scheme is described as a second embodiment.

First Embodiment

Figure 6:
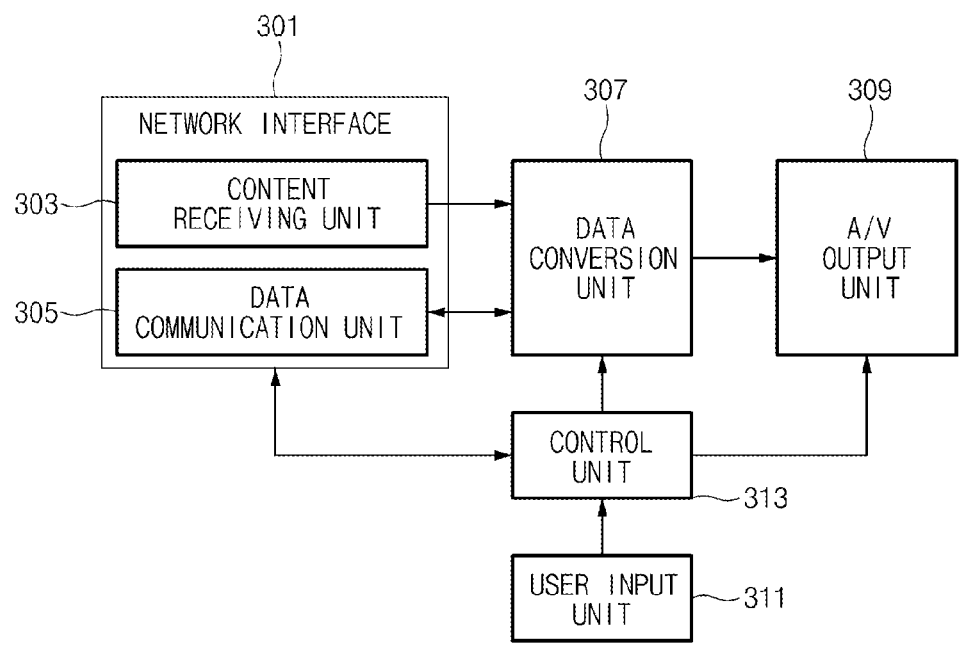
FIG. 6 is an illustration of a content receiving terminal according to a first embodiment of the present invention.

FIG. 6 illustrates a content receiving terminal 300 according to an embodiment of the present invention.

Referring to FIG. 6, the content receiving terminal 300 includes a network interface 301, a data conversion unit 307, an A/V (Audio/Video) output unit 309, a user input unit 311, a control unit 313, and the like.

The network interface 301 includes a content receiving unit 303 for receiving digital contents from the content providing server 100 and a data communication unit 305 for receiving the zapping advertisement from the zapping advertisement server 200. The content receiving unit 303 receives digital broadcasting, VOD contents, applications, and the like, according to the type of content providing server 100. The data communication unit 305 transmits a screen switching request signal which may be a channel changing request signal, a genre changing request signal, a category changing request signal, and the like, to the zapping advertisement server 200 and receives a zapping advertisement corresponding to the screen switching request signal from the zapping advertisement server 200. Further, the data communication unit 305 transmits an additional information request signal to the zapping advertisement server 200 and receives the additional information corresponding to the zapping advertisement from the zapping advertisement server 200.

The data conversion unit 307 is operated in one of a content output mode and a zapping advertisement output mode. In the content output mode, the data conversion unit 307 demodulates digital contents received from the content receiving unit 303 and converts the demodulated digital contents into an output signal. Further, in the zapping advertisement output mode, the data conversion unit 307 demodulates the zapping advertisement or the additional information corresponding to the zapping advertisement received from the data communication unit 305 and transmits the demodulated zapping advertisement or additional information to the A/V output unit 309.

The A/V output unit 309 processes the signal demodulated and converted to a reproducible A/V signal by the data conversion unit 307 and outputs the processed signal to the display screen (not shown). In the case of presenting media content, the audio and video signals are generally output simultaneously, but in an embodiment, only the video signal of the zapping advertisement or the additional information may be output.

The user input unit 311 receives a screen switching request signal or the additional information request signal that is provided through pressing a button of a remote controller or a button attached to the content receiving terminal 300. In an embodiment, the screen switching request signal is generated by an input of a channel button or a direction button and the additional information request signal is generated by an input of a specific button (hot key button).

The control unit 313 controls each component of the content receiving terminal 300 as an integrated component. When the screen switching request signal is input through the user input unit 311 during a content output mode, the control unit 313 transmits the screen switching request signal to the data communication unit 305 and switches the output mode of the data conversion unit 307 to a zapping advertisement output mode. Further, when the additional information request signal is received through the user input unit 311 during the zapping advertisement output mode, the control unit 313 transmits the additional information request signal to the data communication unit 305 and maintains the operation mode of the data conversion unit 307 as the zapping advertisement output mode.

When the additional information request signal is input during the content output mode, the control unit 313 may maintain the operation of the data conversion unit 307 as the content output mode or switch the operation of the data conversion unit 307 to the zapping advertisement output mode. In other words, in an embodiment, when the additional information request signal is input after the zapping period lapses, the additional information request is not detected and the content is displayed without interruption. In another embodiment, the content receiving terminal 300 is configured to continuously detect the additional information request signal. Thus, even though the zapping period lapses, an additional information request may be detected after the zapping period has lapsed, and thus the additional information corresponding to the zapping advertisement exposed for the previous zapping period may be displayed.

When the zapping advertisement is received through the data communication unit 305, the control unit 313 controls the data conversion unit 307 and the A/V output unit 309 so that the zapping advertisement is exposed during the zapping time until the next content is decoded and displayed. When the zapping advertisement is not received for predetermined time due to the communication failure in the zapping advertisement output mode, the control unit 313 switches the operation of the data conversion unit 305 to the content output mode.

Figure 7:
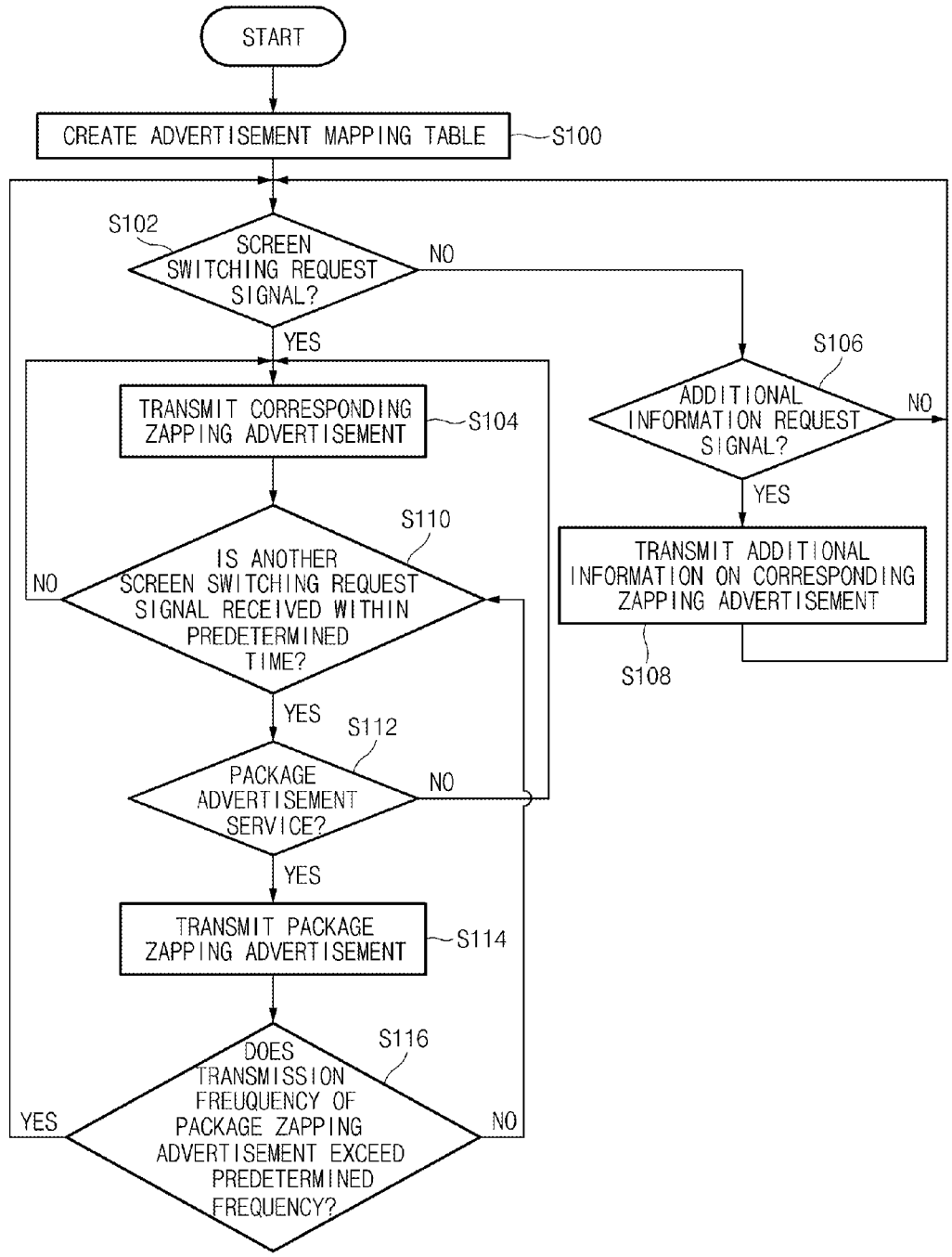
FIG. 7 is a flow chart illustrating an operating process of a zapping advertisement server according to the first embodiment of the present invention.

FIG. 7 is a flow chart illustrating an operating process of the zapping advertisement server according to an embodiment of the present invention. The operation process of the zapping advertisement server 200 illustrated in FIG. 7 is performed with respect to a content receiving terminal 300.

Referring to FIG. 7, the zapping advertisement server 200 first receives the zapping advertisement application from the advertiser terminal 400 as illustrated in FIG. 3 to store and manage the zapping advertisement and the additional information and creates an advertisement mapping table based on the zapping advertisement application content (S100).

Next, the zapping advertisement server 200 determines whether a signal received by the content receiving terminal 300 is the screen switching request signal (S102). If it is determined that the signal received from the content receiving terminal 300 is the screen switching request signal, the zapping advertisement server 200 refers to the advertisement mapping table to retrieve the zapping advertisement corresponding to the requested screen switching region (channel, genre, or category to be changed) from among the advertisements stored in the database unit 201 and transmits the retrieved zapping advertisement to the content receiving terminal 300 (S104). When the signal received by the content receiving terminal 300 is not the screen switching request signal, is the terminal determines whether the received signal is the additional information request signal (S106). If it is determined that the received signal is the additional information request signal, the zapping advertisement server 200 retrieves the additional information corresponding to the currently exposed zapping advertisement from the database unit 201 and transmits the extracted additional information to the content receiving terminal 300 (S108).

Next, the zapping advertisement server 200 transmits the corresponding zapping advertisement in response to the screen switching request signal (first screen switching request signal). The zapping advertisement server 200 determines whether another screen switching request signal (second screen switching request signal) is received within a predetermined time from the receiving time (the switching time to the first screen) of the first screen switching request signal (S110). When the second screen switching request signal is received within the predetermined time, the zapping advertisement server 200 determines whether the zapping advertisement at the time of the first screen switching is associated with a package advertisement service (S112).

If it is determined that the target advertisement point purchased by the advertiser is associated with a package advertisement service the zapping advertisement server 200 transmits the package zapping advertisement registered in the package advertisement service (S114). That is, the zapping advertisement server 200 may retransmit the same zapping advertisement (first zapping advertisement) displayed at the time of the first screen switching or transmit another zapping advertisement (second zapping advertisement) associated with the first zapping advertisement through the package service.

After the zapping advertisement associated with the package is transmitted, the zapping advertisement server 200 determines whether the number of times that zapping advertisements associated with the package service (times that related advertisements are continuously exposed) of the package zapping advertisement is equal to or greater than a predetermined number of times (S116). When the number of the transmission times of the package zapping advertisement is greater than or equal to the predetermined number of times, the package advertisement ends and the process returns to step S102. When the number of the transmission times of the package zapping advertisement is less than a predetermined times, the package advertisement may be continued, and therefore the process returns to S110 to determine whether the screen switching request signal is received within the predetermined time.

FIG. 8 illustrates an example in which the package zapping advertisement is exposed to the content receiving terminal 300.

Figure 8A:
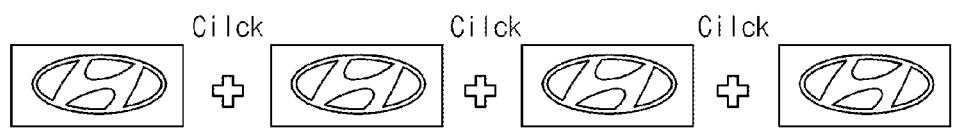
FIGS. 8A and 8B are diagrams illustrating continuous, or repeated, exposures of zapping advertisements in a package advertisement service according to embodiments of the present invention.
Figure 8B:
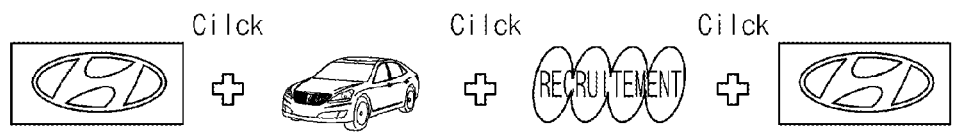

FIG. 8A illustrates an advertisement form in which the same zapping advertisement in a logo form is exposed continuously for four times and FIG. 8B illustrates an advertisement form in which the first zapping advertisement (enterprise logo) is exposed and a second zapping advertisement (car image) and a third zapping advertisement (employee recruiting) associated with the first zapping advertisement are sequentially exposed, and then the first zapping advertisement is exposed again.

In the package zapping advertisement, the number of times that the zapping advertisement is continuously exposed, the exposure sequence of the zapping advertisement, the kind of zapping advertisements to be exposed, and the like are set by an advertiser in the zapping advertiser application. In an embodiment, a parameter that may be set by the advertiser in the application is the time period in which an advertisement is continuously exposed. In another embodiment, the advertiser may select a number of times that a zapping advertisement, or a set of zapping advertisements, is exposed within a set amount of time. In other words, an advertiser may set the frequency with which one or more zapping advertisement is exposed in the application.

Figure 9:
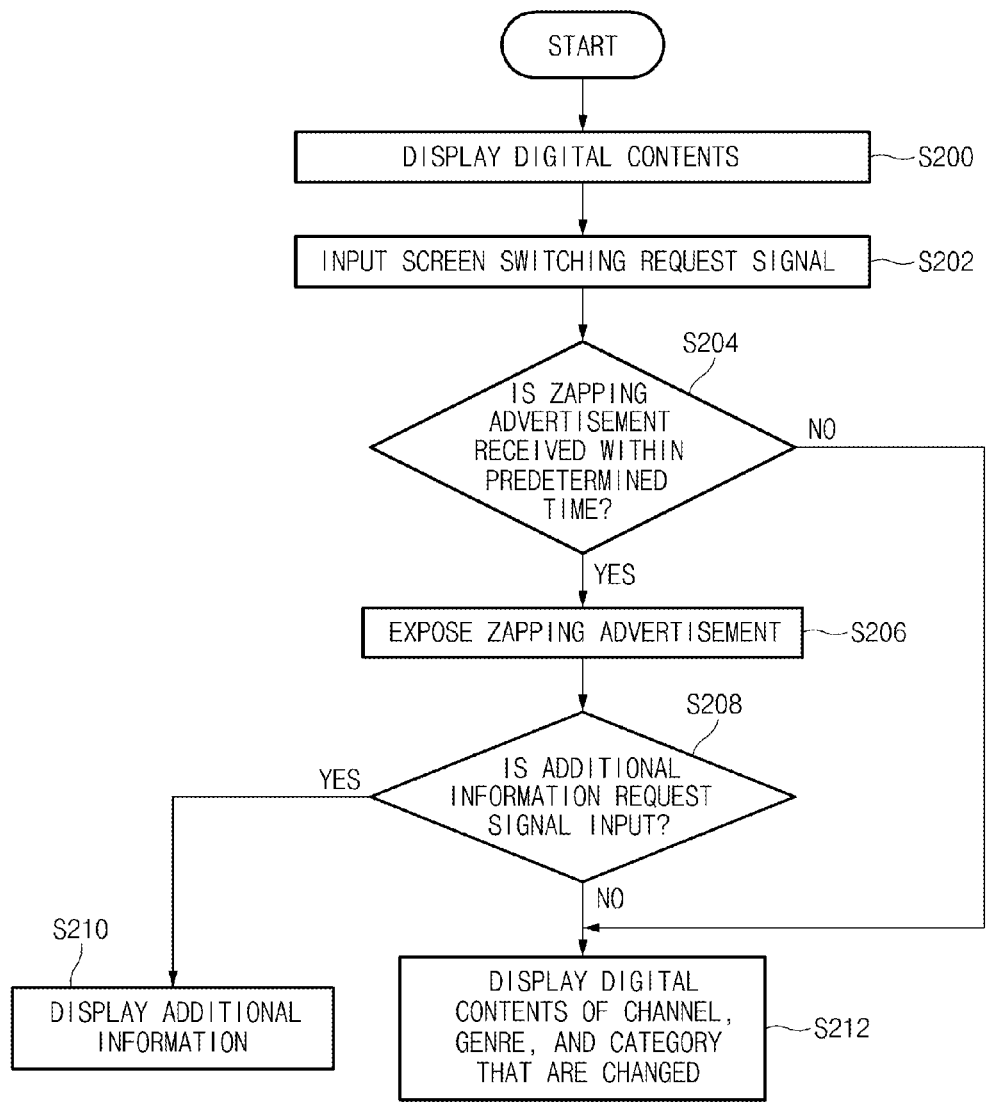
FIG. 9 is a flow chart illustrating an operating process of a content receiving terminal according to the first embodiment of the present invention.

FIG. 9 is a flow chart illustrating an operating process of the content receiving terminal according to an embodiment of the present invention.

Referring to FIG. 9, the content receiving terminal 300 receives various digital contents from the content providing server 100 and displays the received digital contents on a display screen (S200). When the user inputs the screen switching request signal while the contents are displayed (S202), data corresponding to the screen switching request signal is transmitted to the zapping advertisement server 200.

The content receiving terminal 300 determines whether the zapping advertisement is received from the zapping advertisement server 200 within a predetermined time from a time at which the screen switching request signal is input (S204). In an embodiment, the predetermined time may be less than the zapping time. When the zapping advertisement is not received within the predetermined time, the content receiving terminal is a blank state in which nothing is displayed. After the zapping time lapses, the digital contents of the channel, genre, or category to be changed (new content) is displayed (S212).

When the zapping advertisement is received within the predetermined time, the content receiving terminal 300 exposes the received zapping advertisement during the zapping time (S206). Next, the content receiving terminal 300 determines whether an additional information request signal is input during the zapping time when the zapping advertisement is exposed (S208). As soon as the additional information request signal is received during the zapping time, the screen including the additional information corresponding to the zapping advertisement is displayed (S210). When the additional information request signal is not received, the digital contents of the changed (new) channel, genre, or category are displayed (S212).

In FIG. 9, it is determined whether the additional information request signal is input during the zapping time, and in an embodiment it may be determined whether the additional information request signal is input even after the zapping time lapses. That is, when the zapping time lapses and then the hot key is pressed while the next screen is displayed, the additional information corresponding to the zapping advertisement exposed during the previous zapping time may be displayed. Thus, even after the zapping time lapses, the additional information request can be made. Therefore, it is possible to prevent the situation in which a user wishes to view the additional information, but the zapping time is not sufficient for the viewer to input a signal while the zapping advertisement is still displayed.

Figure 10:
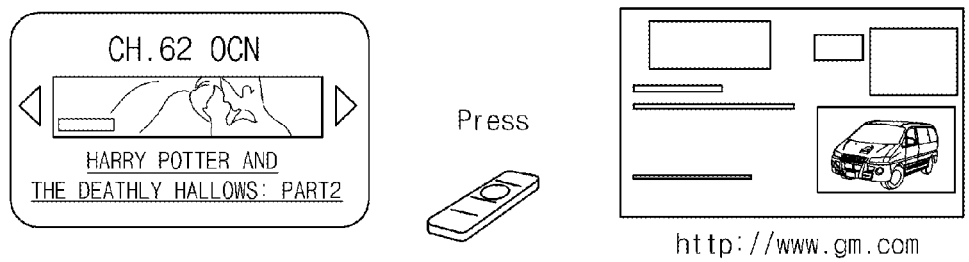
FIG. 10 is a diagram illustrating an example in which additional information corresponding to the zapping advertisement is displayed.

FIG. 10 is a diagram illustrating an embodiment in which the additional information corresponding to the zapping advertisement is displayed.

As illustrated in the left side of FIG. 10, words or sentences indicating the input (for example, Ch. 62) of a specific key to the user are displayed on the advertisement screen exposed during the zapping time. When the user watching the words or the sentences presses the specific key using a remote controller, a screen including the additional information (for example, homepage information of gm.com) on the corresponding advertisement may be displayed as illustrated in the right side of FIG. 10.

For example, a logo of GM Company may be broadcast during the zapping time in an Internet based IPTV or a smart TV. In this case, when a user presses a specific key, the screen may move to an Internet page including information on a new car of GM Company this month. To this end, in an embodiment, the zapping advertisement screen includes a web address (URL) of the corresponding Internet page.

Second Embodiment

Figure 11:
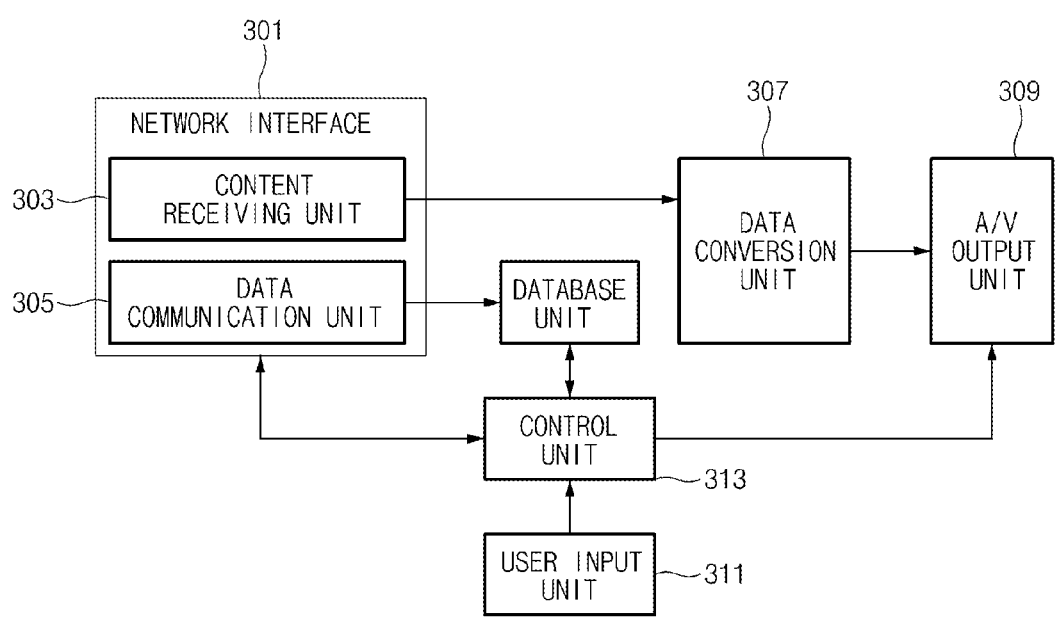
FIG. 11 is an internal configuration diagram of a content receiving terminal according to a second embodiment of the present invention according to an embodiment of the present invention.

FIG. 11 illustrates an internal configuration of a content receiving terminal according to another embodiment of the present invention.

Referring to FIG. 11, the content receiving terminal 300 includes the network interface 301, the data conversion unit 307, the A/V output unit 309, the user input unit 311, and the control unit 313, each of which may be the same as corresponding components in the content receiving terminal illustrated in FIG. 6. However, in the embodiment illustrated in FIG. 11, the content receiving terminal 300 is operated in a stand-alone scheme and therefore further includes a database unit 315 for storing and managing zapping advertisements, additional information, and the advertisement mapping table.

The network interface 301 includes a content receiving unit 303 for receiving digital contents from the content providing server 100 and a data communication unit 305 for receiving the zapping advertisement from the zapping advertisement server 200. In contrast to the content receiving terminal of FIG. 6, the data communication unit 305 does not receive the zapping advertisement corresponding to the screen switching section in real time, but receives and downloads a plurality of zapping advertisements from the zapping advertisement server 200 at the same time. The data communication unit 305 receives the additional information corresponding to the zapping advertisement and the advertisement mapping table in addition to the zapping advertisement from the zapping advertisement server 200.

The data conversion unit 307 operates in one of the content output mode or the zapping advertisement output mode. In the content output mode, the data conversion unit 307 demodulates the digital contents received from the content receiving unit 303 and converts the demodulated digital contents into a signal that can be output. Further, in the zapping advertisement output mode, the data conversion unit 307 demodulates the zapping advertisement or the additional information corresponding to the zapping advertisement stored in the database unit 315 and transmits the demodulated zapping advertisement or additional information to the A/V output unit 309.

The A/V output unit 309 processes the signal demodulated and converted to a reproducible A/V signal by the data conversion unit 307 and outputs the processed signal on the display screen. In the case of the contents, the audio and video signals are generally output simultaneously, but in an embodiment, only the video signal of the zapping advertisement or the additional information may be output.

The user input unit 311 receives the screen switching request signal or the additional information request signal that is provided through a user pressing a button of a remote controller or a button attached to the content receiving terminal 300. The screen switching request signal is provided by an input of a channel button or a direction button and the additional information request signal is generated based on an input of a specific button (hot key button).

The control unit 313 serves to control each component of the content receiving terminal 300 as an integrated component. When the screen switching request signal is received by the user input unit 311 during the content output mode operation, the control unit 313 switches the operation of the data conversion unit 307 to the zapping advertisement output mode. Further, the control unit 313 uses the advertisement mapping table to retrieve the corresponding zapping advertisement from the database unit 315 and transmit the retrieved zapping advertisement to the data conversion unit 307.

Further, when the additional information request signal is input to the user input unit 311 during the zapping advertisement output mode operation, the control unit 313 maintains the operation of the data conversion unit 307 in the zapping advertisement output mode. Further, the control unit 313 uses the advertisement mapping table to determine whether the additional information is registered, and if it is determined that the additional information is present, retrieves the corresponding additional information from the database unit 315 and transmits the retrieved additional information to the data conversion unit 307. In an embodiment in which the additional information is a web address (URL) for accessing the Internet page, the extraction operation of the additional information or the data conversion process in the data conversion unit 307 may be omitted.

Figure 12:
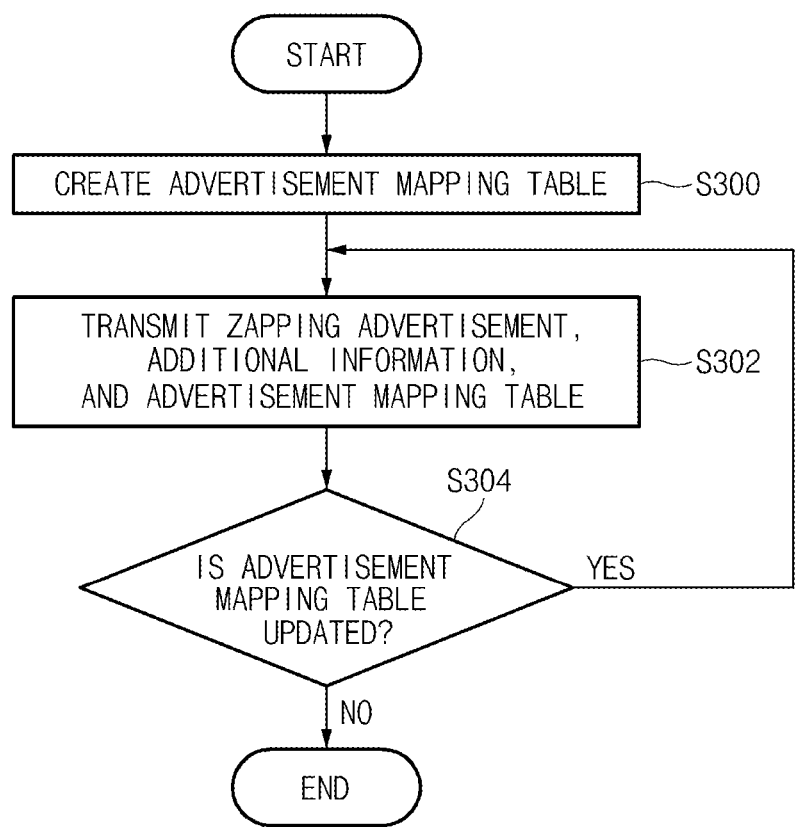
FIG. 12 is a flow chart illustrating an operating process of a zapping advertisement server according to the second embodiment of the present invention.

FIG. 12 illustrates an operating process of the zapping advertisement server according to another embodiment of the present invention.

Referring to FIG. 12, the zapping advertisement server 200 first receives the zapping advertisement application from the advertiser terminal 400 as illustrated in FIG. 3 to store and manage the zapping advertisement and the additional information and creates an advertisement mapping table based on the zapping advertisement application content (S300).

Next, the zapping advertisement server 200 transmits the zapping advertisement, the additional information, and the advertisement mapping table to the content receiving terminal 300 (S302). Next, the zapping advertisement server 200 receives a new zapping advertisement application. Alternatively, the zapping advertisement server 200 recognizes that the existing zapping advertisement contract terminates, and thus it is determined whether the advertisement mapping table is to be changed or updated (S304). If it is determined that the advertisement mapping table is to be updated, the process returns to step S302 to carry out the transmission operation again.

The zapping advertisement server 200 may transmit a first zapping advertisement, and the like, to the content receiving terminal 300 and carry out the transmission operation every time the zapping advertisement is updated. In addition, server 200 may carry out the transmission operation at predetermined periods or according to a transmission request of the content receiving terminal 300. In an embodiment, all the data may be transmitted. In another embodiment, only changed or updated portions of data may be transmitted in consideration of a communication load. The data stored in the zapping advertisement server 200 may be synchronized with the data stored in the content receiving terminal 300 according to the transmission operation of the zapping advertisement server 200.

Figure 13:
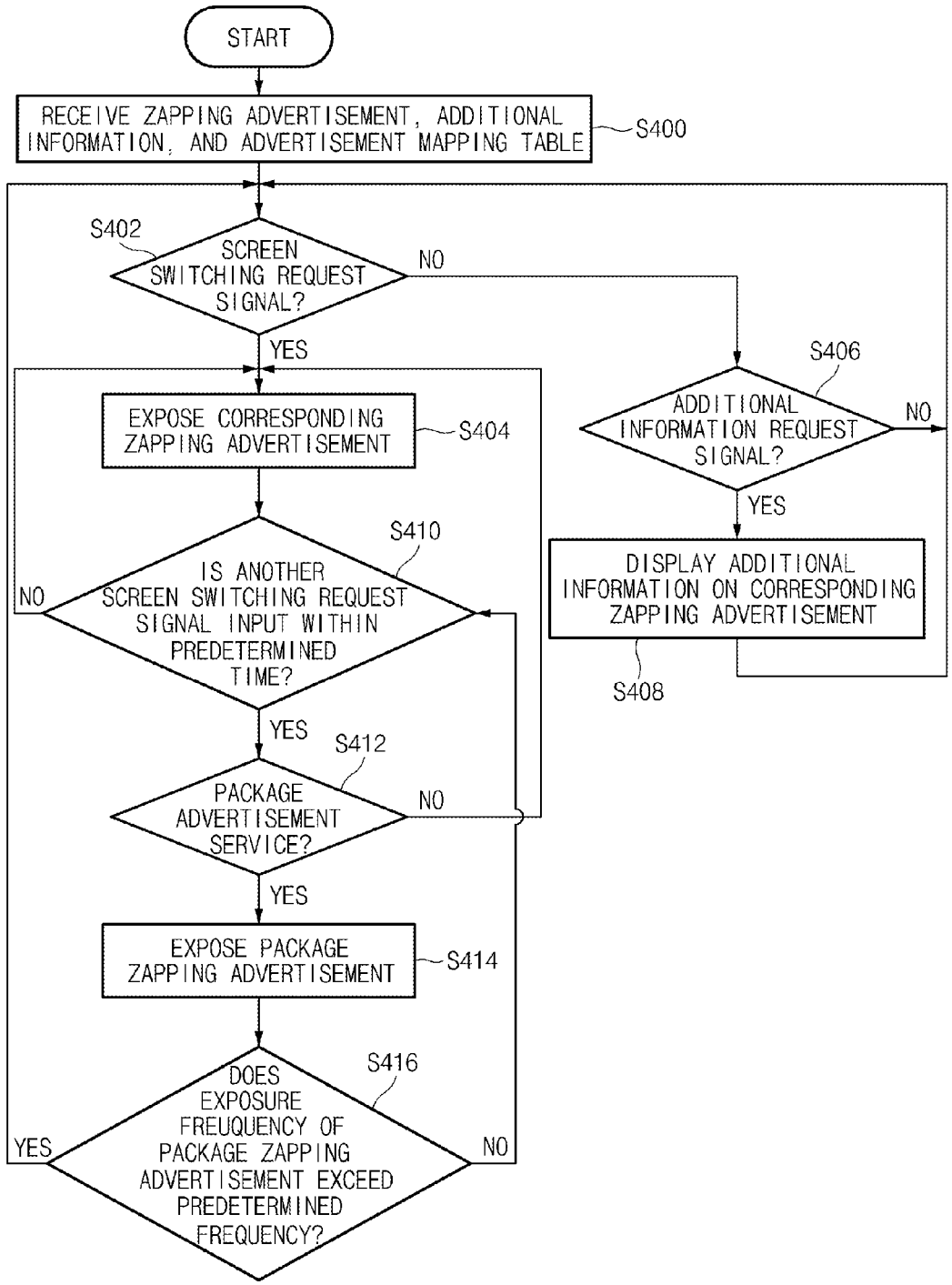
FIG. 13 is a flow chart illustrating an operating process of a content receiving terminal according to the second embodiment of the present invention.

FIG. 13 illustrates an operating process of the content receiving terminal according to another embodiment of the present invention.

Referring to FIG. 13, the content receiving terminal 300 first receives the zapping advertisement, the additional information, and the advertisement mapping table from the zapping advertisement server 200 and stores and manages the received zapping advertisement, additional information, and advertisement mapping table in the database unit 315 (S400). The content receiving terminal 300 may receive data, such as the zapping advertisement, and the like, every time the data are updated, periodically, or by a request to synchronize the database unit 315 with the database unit 201 of the zapping advertisement server 200. The operations of the content receiving terminal 300 may be carried out by the control unit 313 and will be described below as being carried out by the content receiving terminal 300.

Next, the content receiving terminal 300 determines whether the signal received by the user input unit 311 is the screen switching request signal (S402). When the signal received by the user input unit 311 is the screen switching request signal, the content receiving terminal 300 refers to the advertisement mapping table to extract the zapping advertisement corresponding to the requested screen switching section (channel, genre, or category to be changed) from among the advertisements stored in the database unit 315, and exposes the extracted zapping advertisement for the zapping time (S404).

When the signal received by the user input unit 311 is not a screen switching request signal, it may be determined that the received signal is an additional information request signal (S406). If it is determined that the received signal is the additional information request signal, the content receiving terminal 300 retrieves the additional information corresponding to the currently exposed zapping advertisement from the database unit 315 and displays the retrieved additional information corresponding to the display screen (S408).

Next, the content receiving terminal 300 exposes the corresponding zapping advertisement in response to the screen switching request signal (first screen switching request signal), and then determines whether another screen switching request signal (second screen switching request signal) is input within a predetermined time starting from the receiving time (the switching time to the first screen) of the first screen switching request signal (S410). When the screen switching request signal is input within the predetermined time, the content receiving terminal 300 determines whether the target advertisement point is applied as a package advertisement service in the advertisement mapping table (S412).

If it is determined that the target advertisement point purchased by the advertiser is applied in accordance with a package advertisement service, the content receiving terminal 300 exposes the package zapping advertisement registered in the package advertisement service (S414). That is, the content receiving terminal 300 may expose the zapping advertisement (first zapping advertisement) again at the time of switching the first screen according to the exposure method set in the advertisement mapping table, or expose another zapping advertisement (second zapping advertisement) associated with the first zapping advertisement.

After the package zapping advertisement is exposed, the content receiving terminal 300 determines whether the number of times the package zapping advertisement is exposed is equal to or greater than a predetermined value (S416). When the number of times exceeds the predetermined value, the package advertisement service ends and the process returns to S402. On the other hand, when the number of times is less than the predetermined value, the package advertisement may be continued, and therefore the process returns to S410 to determine whether the screen switching request signal is received within the predetermined time.

As described above, the content receiving terminal 300 may carry out the zapping advertisement service according to the stand-alone scheme and a zapping advertisement service history carried out for the predetermined period may be transmitted to the zapping advertisement server 200. The zapping advertisement service history including the advertisement exposure values for each channel, genre, and category is transmitted to the zapping advertisement server 200 and the zapping advertisement server 200 may collect and integrate the zapping advertisement service history received form each content receiving terminal 300 to calculate the advertisement cost to be charged to each advertiser.

It will be appreciated by those skilled in the art that various modifications and alterations can be made without departing from the essential characteristics of the present invention. Embodiments of the present invention are not limited to the embodiments disclosed in the specification above.

INDUSTRIAL APPLICABILITY

A method and system for a zapping advertisement according to an embodiment of the present invention can provide additional information related to a zapping advertisement to a recipient and provide the zapping advertisement at the time of switching a screen, such that a method and system of a zapping advertisement may be applied to a display device having switching zapping time.

The invention claimed is:

1. A method for a zapping advertisement service, comprising:
   providing a zapping advertisement for a zapping time, the zapping advertisement being exposed on a screen during the zapping time and being covered by contents of a broadcasting service, video on demand service, an application service, or a combination thereof after the zapping time elapses;
   sensing an additional information request signal from a user input unit, the additional information request signal requesting additional information corresponding to the zapping advertisement; and
   when the additional information request signal is sensed, providing the additional information,
   wherein providing the zapping advertisement comprises:
   providing a first zapping advertisement for a first zapping time generated when switching to a first content included in the contents of the broadcasting service, video on demand service, application service, or the combination thereof;
   providing the first zapping advertisement, a second zapping advertisement associated with the first zapping advertisement for a second zapping time, or both, the second zapping time being generated when switching to a second content at a predetermined time after the first zapping time is generated, the second content being included in the contents of the broadcasting service, video on demand service, application service, or the combination thereof; and
   providing a third zapping advertisement independent of the first zapping advertisement for a third zapping time generated at the time of being switched to a third content included in the contents of the broadcasting service, video on demand service, application service, or the combination thereof when the predetermined time lapses from a time of switching to the first content.

2. The method according to claim 1, wherein the zapping time corresponds to screen switching carried out by changing a channel of a broadcasting service, a program genre of a video on demand service, or a category of an application service.

3. A method for a zapping advertisement service, comprising:
   providing a first zapping advertisement for a first zapping time generated when switching to a first content, the first zapping advertisement being exposed during the first zapping time and being covered by the first content after the first zapping time elapses; and
   providing the first zapping advertisement or a second zapping advertisement associated with the first zapping advertisement for a second zapping time generated at the time of being switched to a second content within a predetermined time from a time of switching to the first content, the first zapping advertisement or the second zapping advertisement being exposed during the second zapping time and being covered by the second content after the second zapping time elapses.

4. A method for a zapping advertisement service, comprising:
   providing a zapping advertisement for a zapping time, the zapping advertisement being exposed on a screen during the zapping time and being covered by contents of a broadcasting service, video on demand service, an application service, or a combination thereof after the zapping time elapses;

sensing an additional information request signal from a user input unit, the additional information request signal requesting additional information corresponding to the zapping advertisement; and when the additional information request signal is sensed, providing the additional information, wherein providing the zapping advertisement includes, comprising:

providing a first zapping advertisement for a first zapping time generated when switching to a first content included in the contents of the broadcasting service, video on demand service, application service, or the combination thereof; and providing a second zapping advertisement independent of the first zapping advertisement when a number of times of which the first zapping advertisement is exposed exceeds a predetermined value for the first zapping time.

5. A non-transitory computer-readable medium with a program stored thereon which, when executed by a processor, performs the following method:

providing a user interface to an advertiser terminal, the user interface being in communication with an advertisement server;

providing an advertisement application;

providing a plurality of content service regions;

associating one or more of the content service regions with a target advertisement point, the content service regions including a channel region of a broadcasting service, a program genre region of a video on demand service, and a category region of an application service, the target advertisement point including a channel, a genre, and a category that are changed;

providing a price model of the zapping advertisement based on a target advertisement point selected by the advertisement server;

providing a plurality of services associated with the zapping advertisement, and uploading a zapping advertisement and additional information corresponding to the zapping advertisement to the advertisement server, the additional information being presented on screen when a request is received from a user input unit and when the zapping advertisement is exposed on the screen.

6. The non-transitory computer readable medium according to claim 5, wherein providing the plurality of services associated with the zapping advertisement comprises providing a first type of advertisement service including a charge for each target advertisement point as a general advertisement service, or a second type of service in which an advertiser can purchase each target advertisement point as a package of advertisement services through which the advertisement can be continuously, or repeatedly, exposed, or both.

7. A zapping advertisement server, comprising:
a processor; and
a non-transitory computer readable medium, the computer readable medium including program instructions encoded thereon which, when executed by the processor, perform the following method:

providing a user interface for a zapping advertisement application;

receiving a zapping advertisement and additional information associated with the zapping advertisement storing the received zapping advertisement and the additional information in a database unit;

generating an advertisement mapping table according to zapping advertisement application contents; and referring to the advertisement mapping table to transmit a first zapping advertisement when a first screen switching request signal is received and repeatedly providing the first zapping advertisement, or transmitting a second zapping advertisement associated with the first zapping advertisement when a second screen switching request signal is received within a predetermined period from a receiving time of the first screen switching request signal, wherein each of the first zapping advertisement and the second zapping advertisement is exposed on a screen from a time of the first screen switching request signal, a time the second screen switching request signal is received, or both, and fully covered by contents provided from a content providing server after a zapping time elapses.

8. The zapping advertisement server according to claim 7, wherein additional information corresponding to the first zapping advertisement is transmitted by the advertisement server when an additional information request signal for the first zapping advertisement is received when the first zapping advertisement is exposed, and the additional information request signal is provided from a user input unit.

9. A content receiving terminal, comprising:
a processor;
a database storing a zapping advertisement, additional information corresponding to the zapping advertisement, and an advertisement mapping table; and
a non-transitory computer readable medium, the computer readable medium including program instructions encoded thereon which, when executed by the processor, perform the following method:

receiving a screen switching request signal or an additional information request signal from a user input unit;

referring to the advertisement mapping table to extract and expose a first zapping advertisement from the database during a zapping time, the zapping time beginning when a first screen switching request signal is received from the user input unit;

repeatedly exposing the first zapping advertisement or exposing a second zapping advertisement associated with the first zapping advertisement when a second screen switching request signal is received within a predetermined period from a receiving time of the first screen switching request signal, when the zapping time elapses before the second screen switching request signal is received, covering the first zapping advertisement with contents of a broadcasting service, video on demand service, an application service, or a combination thereof.

10. The content receiving terminal according to claim 9, wherein additional information corresponding to the first zapping advertisement is displayed when an additional information request signal for the first zapping advertisement is received.

11. The method according to claim 3, comprising: providing a third zapping advertisement independent of the first or second zapping advertisements during the first zapping time when a number of exposure times of the first zapping advertisement exceeds a predetermined value.

* * * * *